(12) United States Patent
Gill

(10) Patent No.: US 6,842,316 B2
(45) Date of Patent: Jan. 11, 2005

(54) MAGNETIC SPIN VALVE SENSOR HAVING AN EXCHANGE STABILIZATION LAYER RECESSED FROM THE ACTIVE TRACK EDGE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 226 days.

(21) Appl. No.: 10/306,484

(22) Filed: Nov. 26, 2002

(65) Prior Publication Data
US 2004/0100739 A1 May 27, 2004

(51) Int. Cl.[7] ............................................. G11B 5/39
(52) U.S. Cl. ................................................. 360/324.12
(58) Field of Search .................... 360/324.1, 324.11, 360/324.12, 324.2

(56) References Cited

U.S. PATENT DOCUMENTS

| | | | |
|---|---|---|---|
| 6,191,926 B1 | 2/2001 | Everitt et al. | 360/324.11 |
| 6,266,218 B1 | 7/2001 | Carey et al. | 360/324.12 |
| 6,385,017 B1 | 5/2002 | Min et al. | 360/324.12 |
| 6,714,388 B2 * | 3/2004 | Hasegawa et al. | 360/324.11 |
| 2001/0028540 A1 | 10/2001 | Sakaguci et al. | 360/324.12 |
| 2001/0053053 A1 | 12/2001 | Saito et al. | 360/324.11 |
| 2002/0018323 A1 | 2/2002 | Li et al. | 360/314 |
| 2002/0024781 A1 * | 2/2002 | Ooshima et al. | 360/324.12 |
| 2003/0156361 A1 * | 8/2003 | Li et al. | 360/324.12 |
| 2003/0167625 A1 * | 9/2003 | Li et al. | 29/603.07 |
| 2003/0179517 A1 * | 9/2003 | Horng et al. | 360/324.12 |
| 2004/0042131 A1 * | 3/2004 | Dobisz et al. | 360/324.12 |

* cited by examiner

*Primary Examiner*—David Ometz
(74) *Attorney, Agent, or Firm*—Lewis L. Nunnelley

(57) ABSTRACT

A magnetic spin valve sensor is provided which has antiparallel coupled end tabs to magnetically stabilize the free layer. The antiparallel coupled bias stabilization tabs include antiferromagnetic layers which are laterally recessed from the ends of the ferromagnetic bias layers. A disk drive is provided having the novel spin valve sensor as the read element.

5 Claims, 3 Drawing Sheets

US 6,842,316 B2

MAGNETIC SPIN VALVE SENSOR HAVING AN EXCHANGE STABILIZATION LAYER RECESSED FROM THE ACTIVE TRACK EDGE

BACKGROUND OF THE INVENTION

1. Field of the Invention

The invention relates to a magnetic spin valve sensor typically used in a magnetic disk drive; and, more specifically, to a magnetic spin valve sensor having an antiparallel tab structure with an exchange stabilization layer recessed from the active track edge.

2. Description of the Background Art

Disk drives using magnetic recording of digital information store most of the data in contemporary computer systems. A disk drive has at least one rotating disk with discrete concentric tracks of data. Each disk drive also has at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator which positions the recording head over the specific track of interest. The actuator first rotates to seek the track of interest. After positioning the recording head over the track, the actuator maintains the recording head in close registration to that track. The disk in a disk drive has a substrate and a magnetic layer formed over the substrate for magnetic recording. The slider carrying the recording head has a disk facing surface upon which an air bearing is constructed. The air bearing allows the slider to float on a cushion of air and to be positioned close the disk surface. Alternatively, the slider surface facing the disk can be adapted for partial or continuous contact with the disk.

Magnetic spin valve sensors are used as the read element in most contemporary disk drives. A magnetic spin valve sensor is a sandwich of layers including a ferromagnetic pinned layer, a nonmagnetic electrically conducting layer, and a ferromagnetic free layer. The resistance of the spin valve sensor changes with respect to the direction and magnitude of an applied magnetic field such as the field from a written magnetic transition on a disk. To detect the change in resistance, sense current is passed through the sensor.

The free layer in a magnetic spin valve sensor is usually operated in the presence of a constant weak magnetic field to insure magnetic stability and prevent spurious signals. The application of a weak magnetic field to the sensor is sometimes referred to as magnetically biasing the sensor. One structure which may effectively be used for magnetic biasing is a pair of magnetic tabs which are antiparallel coupled to portions of the free layer. The antiparallel coupled tabs include a ferromagnetic biasing layer and an antiferromagnetic layer exchange coupled to the ferromagnetic biasing layer. This structure is effective; however, when the biasing layers are completely covered with the antiferromagnetic layer, the sensor becomes magnetically stiff and the sensitivity is degraded. Thus, with conventional sensors, sensitivity decreases as stability is achieved.

A magnetic spin valve sensor is needed which has antiparallel coupled biasing tabs and does not sacrifice sensitivity when attaining stability.

SUMMARY OF THE INVENTION

A preferred embodiment of the invention provides a magnetic spin valve sensor which has novel antiparallel coupled biasing tabs. Each antiparallel biasing tab includes a ferromagnetic biasing layer and an antiferromagnetic layer exchanged coupled with the ferromagnetic biasing layer. The antiferromagnetic layer is laterally recessed from the ferromagnetic biasing layer. A magnetic spin valve sensor thus provided is magnetically stable and has high sensitivity. Another embodiment of the invention provides a disk drive having a read element including a magnetic spin valve sensor having antiparallel coupled end tabs with a laterally recessed antiferromagnetic layer.

Other aspects and advantages of the invention will become apparent from the following detailed description, which, when taken in conjunction with the drawings, illustrate by way of example the principles of the invention.

DETAILED DESCRIPTION OF THE INVENTION

A magnetic spin valve sensor according to a preferred embodiment of the invention includes a free layer with antiparallel coupled end tabs each of which has a laterally recessed antiferromagnetic layer. Embodiments of the invention provide a sensor which has good magnetic stability without sacrificing sensitivity.

Figure 1:
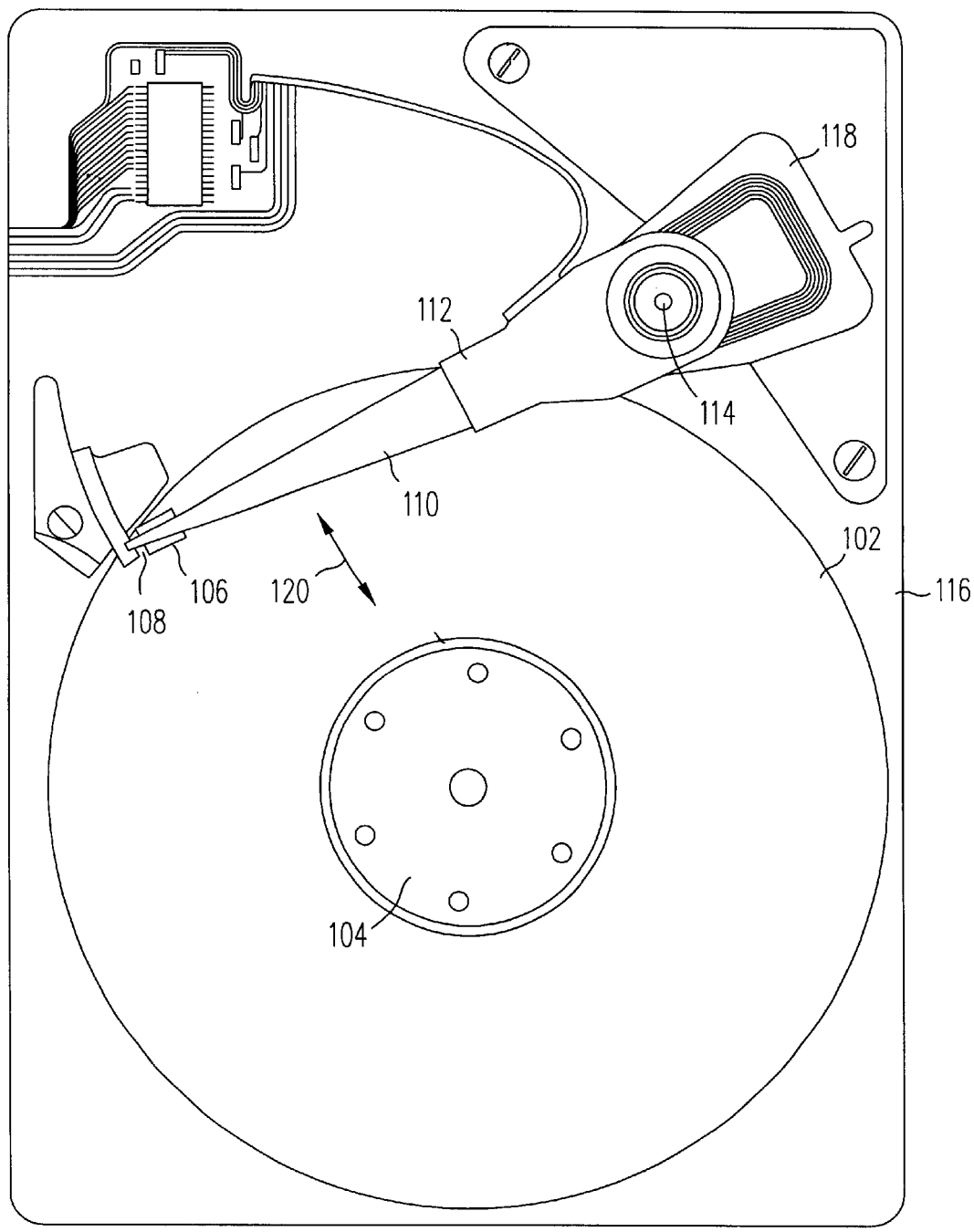
FIG. 1 illustrates a disk drive.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The recording head 108 includes a write element for writing data onto the disk 102. The recording head also includes a magnetic spin valve sensor according to the present invention (shown in detail below) used as a read element for reading data from the disk. The slider 106 is attached to a suspension 110 and the suspension 110 is attached to an actuator 112. The actuator 112 is pivotally attached 114 to the housing 116 of the disk drive 100 and is pivoted by a voice coil motor 118. As the disk is rotating, the actuator 112 positions the slider 106 along with the suspension 110 along a radial arcuate path 120 over the disk 102 surface to access the data track of interest.

Referring to FIG. 1, during operation of the disk drive 100, the motion of the rotating disk 102 relative to the slider 106 generates an air bearing between the slider 106 and the disk 102 surface which exerts an upward force on the slider 106. This upward force is balanced by a spring force from the suspension 110 urging the slider 106 toward the surface of the disk 102. Alternatively, the slider 106 may be in either partial or continuous contact with the disk 102 surface during operation.

Figure 2:
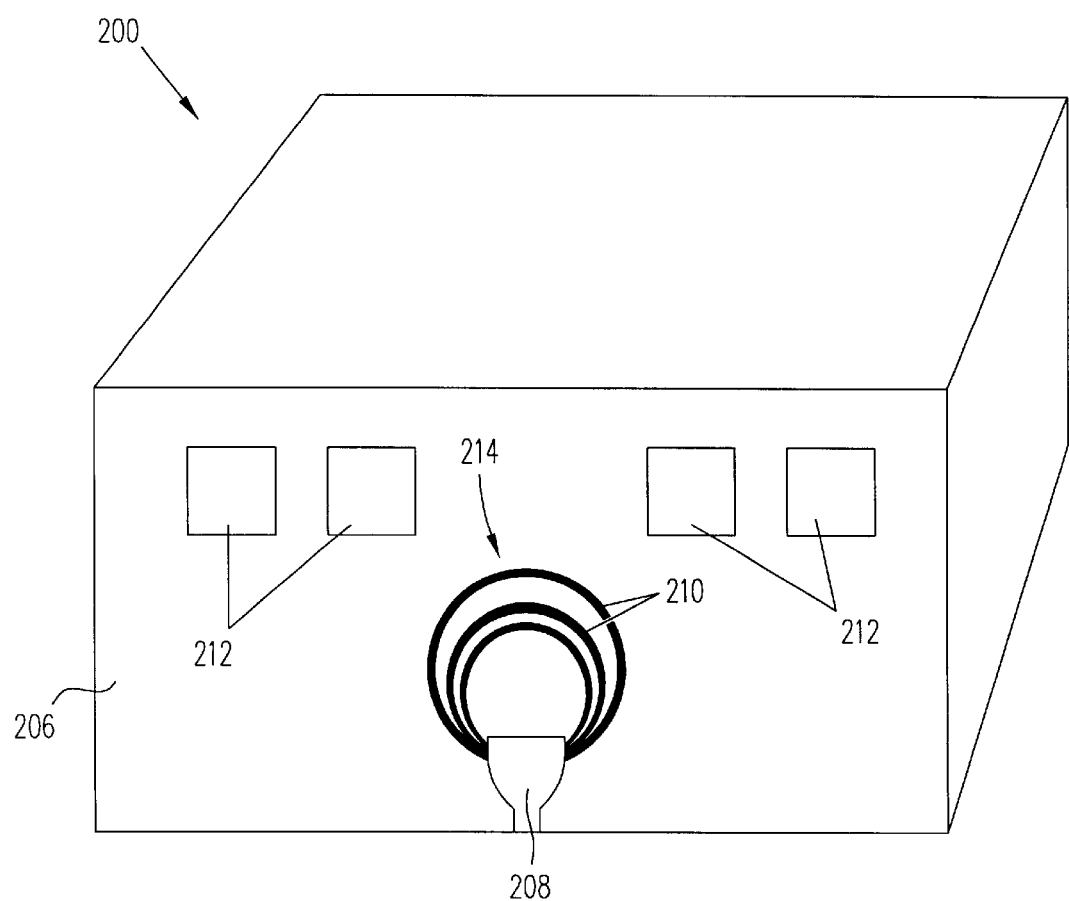
FIG. 2 illustrates a recording head on a slider.

FIG. 2 illustrates a more detailed view of a slider 200. The recording head is preferably constructed on the trailing surface 206 of the slider 200. FIG. 2 illustrates the upper pole 208 and the turns 210 of the coil 214 of the write element of the recording head. The read element is formed between the slider 200 and the write element and is thus not illustrated in FIG. 2. The electrical connection pads 212 which allow connection with the write element and read element are illustrated.

Figure 3:
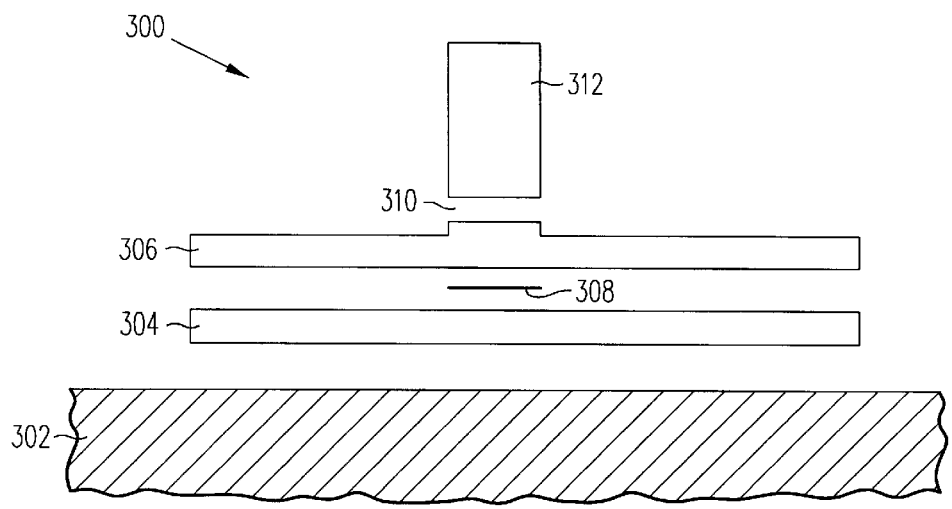
FIG. 3 illustrates the recording head on the disk facing side of the slider; and, FIG. 4 illustrates a spin valve sensor having a recessed exchange stabilization layer.

FIG. 3 illustrates a recording head 300 (not necessarily to scale) as viewed on the disk facing surface of a slider 302. The recording head 300 is constructed on the slider 302 and is usually encased in an insulating material (not shown). The read element sensor 308 according to the present invention is sandwiched between two magnetic shields 304, 306 to improve spatial resolution. One of the magnetic shields 306 is also commonly used as one of the poles of the write head. The write element includes a second pole 312 and a write gap 310.

Figure 4:
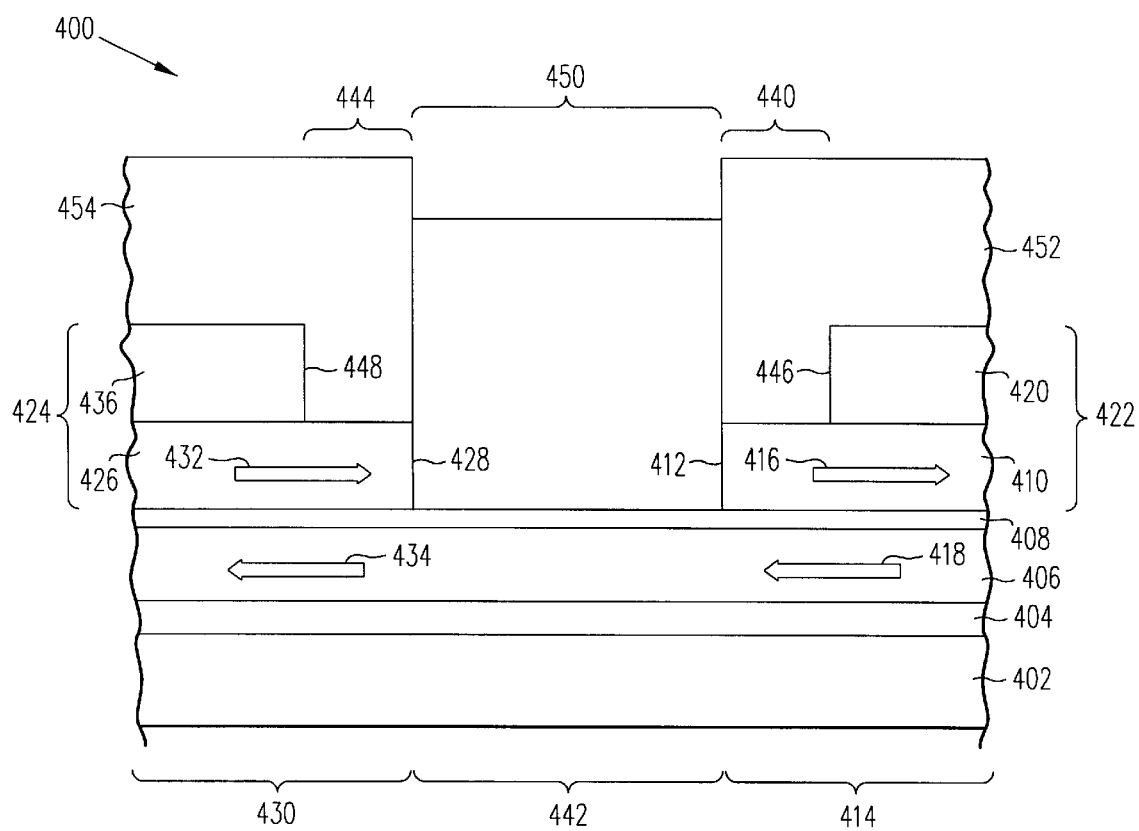

FIG. 4 illustrates an enlarged view (not necessarily to scale) of the magnetic spin valve sensor 400 read element according to the present invention. The sensor 400 includes a pinned layer 402 which may be a single ferromagnetic layer. Alternatively, the pinned layer 402 may be a laminated structure which includes two ferromagnetic layers and an intervening layer, suitably of ruthenium, which promotes antiparallel coupling between the two ferromagnetic layers. The pinned layer 402 may be self-pinned, or alternatively, the pinned layer 402 may be exchange coupled with an adjacent antiferromagnetic layer (not shown). A conductive nonmagnetic layer 404, suitably of copper, is formed over the pinned layer 402. A ferromagnetic free layer 406 is then formed over the conductive nonmagnetic layer 404. A layer 408 of ruthenium is formed over the ferromagnetic free layer 406.

Referring to FIG. 4, the free layer 406 is stabilized magnetically with two antiparallel coupled bias stabilization tabs 422, 424. The first antiparallel coupled bias stabilization tab 422 includes a first ferromagnetic bias layer 410 having an end 412 disposed over the ruthenium layer 408. The first ferromagnetic bias layer 410 is antiparallel coupled to a portion 414 of the free layer 406 across the ruthenium layer 408. The magnetization 418 in the portion 414 of the free layer 406 opposite the first ferromagnetic bias layer 410 is in the opposite direction from the magnetization 416 in the first ferromagnetic bias layer 410. The first antiparallel coupled bias stabilization tab 422 also includes a first antiferromagnetic layer 420 which is formed over and exchange coupled with the first ferromagnetic bias layer 410. The first antiferromagnetic layer 420 establishes the direction of magnetization 416 in the first ferromagnetic bias layer 410.

In like manner, the second antiparallel coupled bias stabilization tab 424 includes a second ferromagnetic bias layer 426 having an end 428 disposed over the ruthenium layer 408. The second ferromagnetic bias layer 426 is antiparallel coupled to a portion 430 of the free layer 406 across the ruthenium layer 408. The magnetization 434 in the portion 430 of the free layer 406 opposite the second ferromagnetic bias layer 426 is in the opposite direction from the magnetization 432 in the second ferromagnetic bias layer 426. The second antiparallel coupled bias stabilization tab 424 also includes a second antiferromagnetic layer 436 which is formed over and exchange coupled with the second ferromagnetic bias layer 426. The second antiferromagnetic layer 436 establishes the direction of magnetization 432 in the second ferromagnetic bias layer 426.

Again referring to FIG. 4, the portions 414, 430 of the free layer 406 which are coupled with the ferromagnetic bias layers 410, 426 contribute little or no signal upon excitation from an external magnetic field. Therefore, the distance 450 between the end 412 of the first ferromagnetic bias layer 410 and the end 428 of the second ferromagnetic bias layer 426 determines the physical width 450 of the active portion 442 of the sensor 400. The physical width 450 is also referred to as the physical trackwidth. As viewed in FIG. 4, the location of the end 412 of the ferromagnetic bias layer 410 in the first bias tab 422 determines the rightmost active track edge, and the location of the end 428 of the ferromagnetic bias layer 426 in the second bias tab 424 determines the leftmost active track edge.

The first antiferromagnetic layer 420 is laterally recessed from the first ferromagnetic bias layer 410 by a distance represented with reference number 440. The second antiferromagnetic layer 436 is laterally recessed from the second ferromagnetic bias layer 426 by a distance represented with reference number 444. Since the ferromagnetic layers 410 and 426 are formed from a soft ferromagnetic material, the magnetization is less rigidly pinned near the ends 412, 428 which are not directly exchange coupled with the antiferromagnetic layers 420, 436. Parenthetically, if the ends of the antiferromagnetic layers were not laterally recessed from the ends of the ferromagnetic bias layers, the active portion of the free layer would be adversely affected by the more strongly nearby antiparallel coupled portions of the free layer: the sensor becomes magnetically stiff and loses sensitivity. To prevent this loss of sensitivity, the ends of the antiferromagnetic layers are laterally recessed from the ends of the ferromagnetic bias layers as illustrated. For each biasing tab the lateral recession distance 440, 444, is preferably about 0.5 $\mu$m; and, a useful range of the lateral recession distance is from about 0.3 $\mu$m to about 0.7 $\mu$m. The leads 452, 454 which supply sense current to the sensor are preferably self-aligned with the ends 412, 428 of the ferromagnetic bias layers 410, 426.

Alternatively, the lateral separation distance between the ends 446, 448 of the antiferromagnetic layers 420, 436 is preferably about 0.6 $\mu$m to about 1.4 $\mu$m wider than the physical width 450 of the active portion 442 of the sensor 400. The lateral separation distance between the ends 446, 448 of the antiferromagnetic layers 420, 436 is the sum of distance represented by reference numbers 444, 450, and 440.

The materials and methods used to manufacture the magnetic spin valve sensor provided by the invention are known to those skilled in the art. The bias layer in each antiparallel coupled tab is formed from a soft ferromagnetic material such as a nickel-iron alloy, or other suitable binary or ternary alloy formed from nickel, iron, and cobalt. Because a soft ferromagnetic material is used for each bias layer, the magnetization in each bias layer is not as strongly pinned for those portions of the bias layer not in contact with the antiferromagnetic layer. Thus, the free layer is less strongly affected by the antiparallel coupling near the edges of the active portion of the free layer. The sensor remains stable, however the sensitivity is not appreciably degraded.

I claim:

1. A magnetic spin valve sensor, comprising:
  a free layer having first and second laterally disposed portions;
  a first bias stabilization tab including a first ferromagnetic bias layer and a first antiferromagnetic layer, said first ferromagnetic bias stabilization tab being antiparallel coupled with said first portion of said free layer,
  a second bias stabilization tab having a second ferromagnetic bias layer and a second antiferromagnetic layer, said second ferromagnetic bias tab being antiparallel coupled with said second portion of said free layer,
  wherein the lateral separation between said first and second antiferromagnetic layers is in the range of about 0.6 $\mu$m to about 1.4 $\mu$m greater than the lateral separation between said first and second ferromagnetic bias layers.

2. A magnetic spin valve sensor, comprising:

a pinned layer;

a nonmagnetic conductive layer disposed over said pinned layer;

a ferromagnetic free layer disposed over said nonmagnetic layer, said ferromagnetic free layer being magnetically stabilized by first and second antiparallel coupled bias stabilization tabs;

a layer of ruthenium disposed over said ferromagnetic free layer, wherein said first antiparallel coupled bias stabilization tab includes a first ferromagnetic bias layer disposed over said ruthenium layer and antiparallel coupled with a portion of said free layer across said ruthenium layer, and a first antiferromagnetic layer disposed over said first ferromagnetic bias layer wherein said first antiferromagnetic layer is laterally recessed from first said ferromagnetic bias layer, and wherein said second antiparallel coupled bias stabilization tab includes a second ferromagnetic bias layer disposed over said ruthenium layer and antiparallel coupled to a portion of said free layer across said ruthenium layer, and a second antiferromagnetic layer disposed over said second ferromagnetic bias layer wherein said second antiferromagnetic layer is laterally recessed from said end of second said ferromagnetic bias layer.

3. A magnetic spin valve sensor according to claim 2 wherein said first antiferromagnetic layer is laterally recessed about 0.3 $\mu$m to about 0.7 $\mu$m from said first ferromagnetic bias layer.

4. A magnetic spin valve sensor according to claim 2 wherein said second antiferromagnetic layer is laterally recessed about 0.3 $\mu$m to about 0.7 $\mu$m from said second ferromagnetic bias layer.

5. A disk drive, comprising:

a disk;

a write element for writing data onto said disk;

a read element for reading data from said disk; including a magnetic spin valve sensor, wherein said magnetic spin valve sensor includes a pinned layer;

a nonmagnetic conductive layer disposed over said pinned layer;

a ferromagnetic free layer disposed over said nonmagnetic layer, said ferromagnetic free layer being magnetically stabilized by first and second antiparallel coupled bias stabilization tabs;

a layer of ruthenium disposed over said ferromagnetic free layer, wherein said first antiparallel coupled bias stabilization tab includes a first ferromagnetic bias layer disposed over said ruthenium layer and antiparallel coupled with a portion of said free layer across said ruthenium layer, and a first antiferromagnetic layer disposed over said first ferromagnetic bias layer wherein said first antiferromagnetic layer is laterally recessed from first said ferromagnetic bias layer, and wherein said second antiparallel coupled bias stabilization tab includes a second ferromagnetic bias layer disposed over said ruthenium layer and antiparallel coupled to a portion of said free layer across said ruthenium layer, and a second antiferromagnetic layer disposed over said second ferromagnetic bias layer wherein said second antiferromagnetic layer is laterally recessed from said end of second said ferromagnetic bias layer.

* * * * *